(12) United States Patent
Barber et al.

(10) Patent No.: US 7,328,908 B2
(45) Date of Patent: Feb. 12, 2008

(54) STEER AXLE AND METHOD OF MAKING THE SAME

(75) Inventors: Sean J. Barber, Kalamazoo, MI (US); Dennis D. Dauber, Jenison, MI (US); David G. Moses, Kalamazoo, MI (US); Gregory A. Richardson, Muskegon, MI (US)

(73) Assignee: Dana Corporation, Toledo, OH (US)

( * ) Notice: Subject to any disclaimer, the term of this patent is extended or adjusted under 35 U.S.C. 154(b) by 235 days.

(21) Appl. No.: 11/289,135

(22) Filed: Nov. 29, 2005

(65) Prior Publication Data

US 2007/0120339 A1    May 31, 2007

(51) Int. Cl.
   *B62D 7/18*    (2006.01)

(52) U.S. Cl. ............... 280/93.512; 180/905; 301/131; 301/132; 301/133

(58) Field of Classification Search .......... 280/93.512; 180/905, 253; 301/124.1, 131, 132, 133, 301/135, 136
See application file for complete search history.

(56) References Cited

U.S. PATENT DOCUMENTS

| | | |
|---|---|---|
| 1,690,510 A | 11/1928 | Urschel |
| 1,762,407 A | 6/1930 | Mogford et al. |
| 1,873,453 A | 8/1932 | Mogford et al. |
| 2,007,893 A | 7/1935 | Crawford |
| 3,804,467 A | 4/1974 | Austermann |
| 4,361,360 A | 11/1982 | Kuether |
| 6,122,948 A | 9/2000 | Moses |
| 6,513,243 B1 | 2/2003 | Bignucolo et al. |
| 6,579,026 B2 | 6/2003 | Moses et al. |
| 6,585,331 B2 * | 7/2003 | Varela ........................ 301/125 |
| 6,641,150 B1 * | 11/2003 | Schlosser et al. ...... 280/93.512 |
| 6,808,189 B1 * | 10/2004 | Schlosser et al. ...... 280/93.512 |
| 2004/0251653 A1 * | 12/2004 | Momiyama .......... 280/124.157 |

* cited by examiner

*Primary Examiner*—Paul N. Dickson
*Assistant Examiner*—Toan C. To
(74) *Attorney, Agent, or Firm*—Marshall & Melhorn LLC

(57) ABSTRACT

A steer axle for a vehicle and a method of making the same involves forming portions of a steer axle to have a three sided design. Spring seats that wrap around two of the three sides are secured to the steer axle. Plates are secured to the spring seats. The plates extend over the third surface of the steer axle. Angled spring pads are located over the plates.

13 Claims, 14 Drawing Sheets

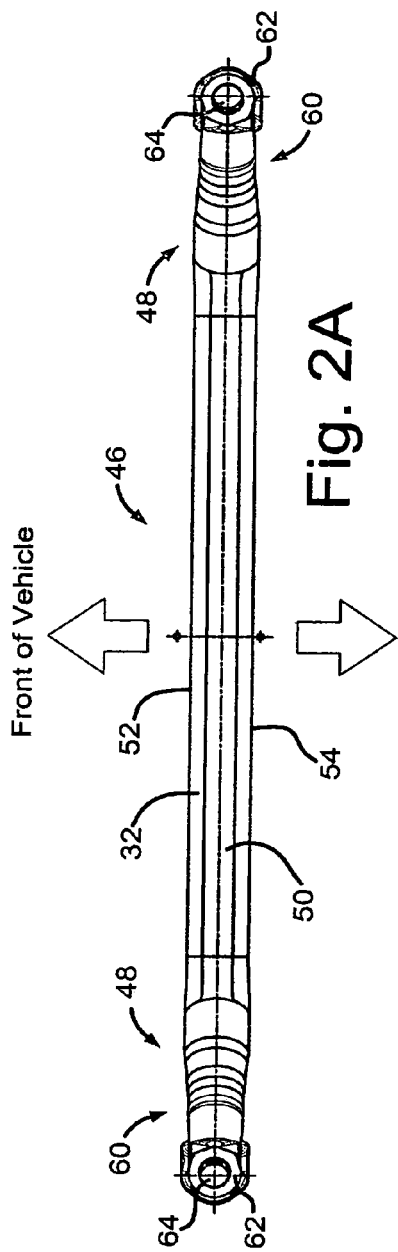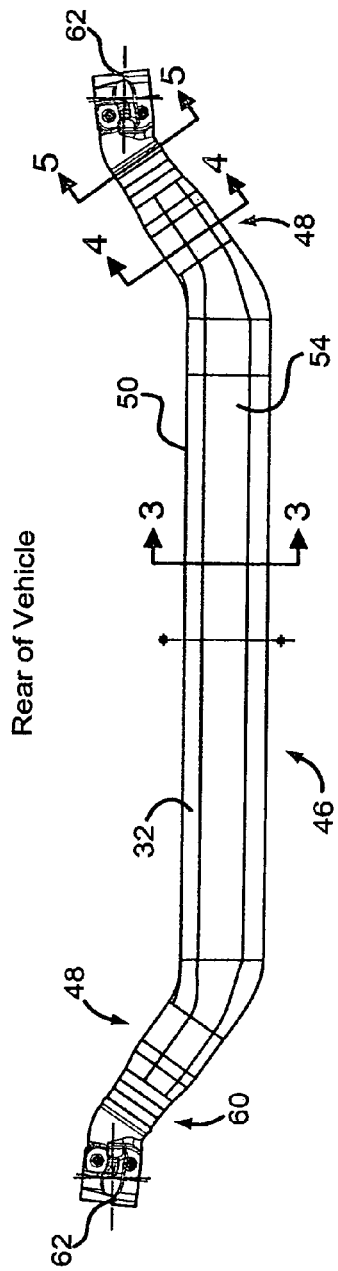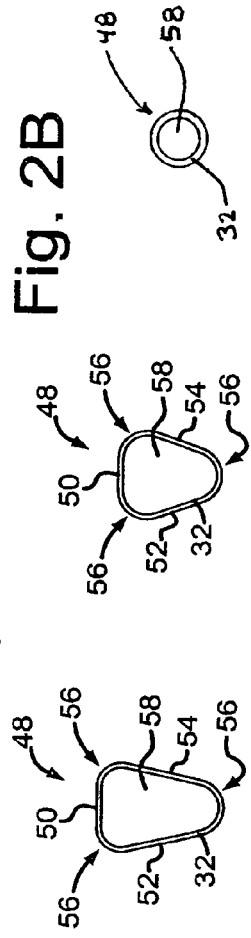

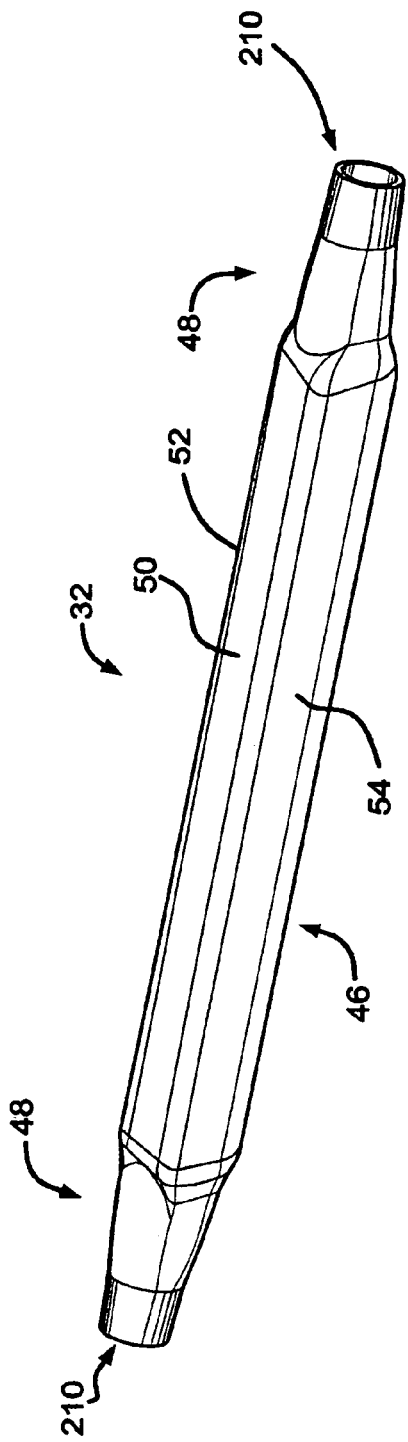
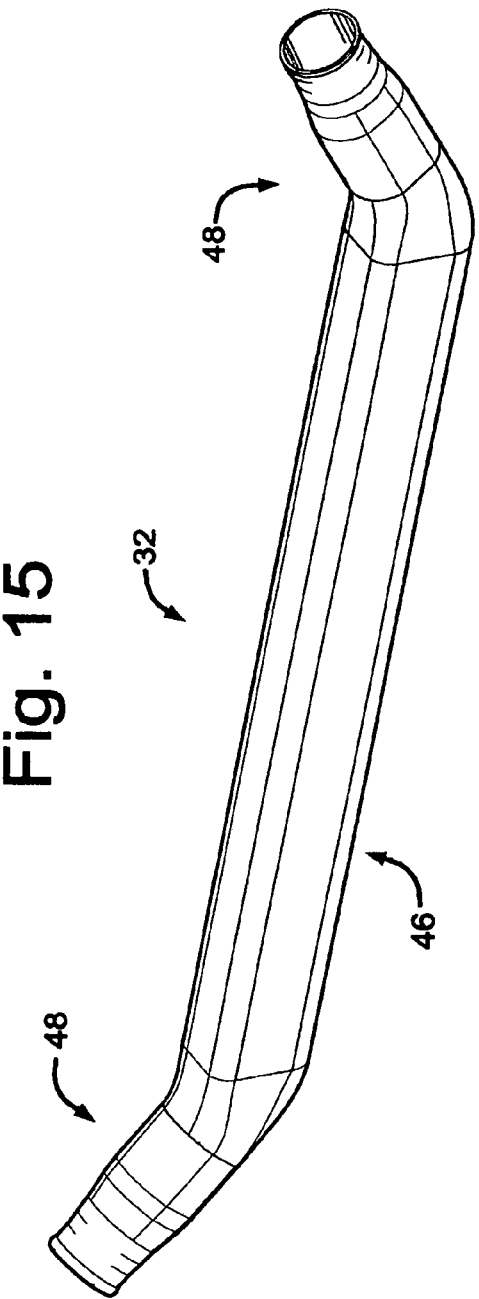
Fig. 15
Fig. 16

STEER AXLE AND METHOD OF MAKING THE SAME

FIELD OF THE INVENTION

The present invention relates to a front steer axle for a vehicle and a method of making the steer axle.

BACKGROUND OF THE INVENTION

Typically, steer axles for vehicles, particularly for trucks, are forged I-beam structures. I-beam steer axles function reasonably well but it would be preferable to create a steer axle that did not require as much material to make, thus saving weight and reducing its cost.

An exemplary embodiment of an I-beam steer axle, and the art that preceeded its design, is depicted and described in U.S. Pat. No. 6,122,948. Based on the figures depicted in the patent, one can appreciate the substantial amount of material required to create the upper flange, the lower flange and the flange that connected the upper and lower flanges. Of course, the additional material required for this design added to the weight and cost of the axle.

SUMMARY OF THE INVENTION

The present invention is directed toward a steer axle and method of making the same. The steer axle is substantially hollow and has a central portion bounded by two end portions. The central portion is formed to have three sides and the end portions have substantially curvilinear cross-sections. First and second spring seats are secured to the central portion. The spring seats each have a portion that wraps substantially around two of the three surfaces of the central portion. A first plate and a second plate are secured to the first and second spring seats, respectively. The first plate and the second plate extend over the third surface of the central portion. A first angled spring pad and a second angled spring pad are each secured to an upper surface of each of the first plate and the second plate, respectively.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2A is a schematic, top view of a steer axle of the present invention;

FIG. 2B is a schematic, back view of the steer axle of FIG. 2A;

FIG. 3 is a schematic, cross-sectional view taken along line 3-3 of FIG. 2B;

FIG. 4 is a schematic, cross-sectional view taken along line 4-4 of FIG. 2B;

FIG. 5 is a schematic, cross-sectional view taken along line 5-5 of FIG. 2B;

FIGS. 13-16 depict schematic perspective views of a preferred method of making a steer axle of the present invention;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1A:
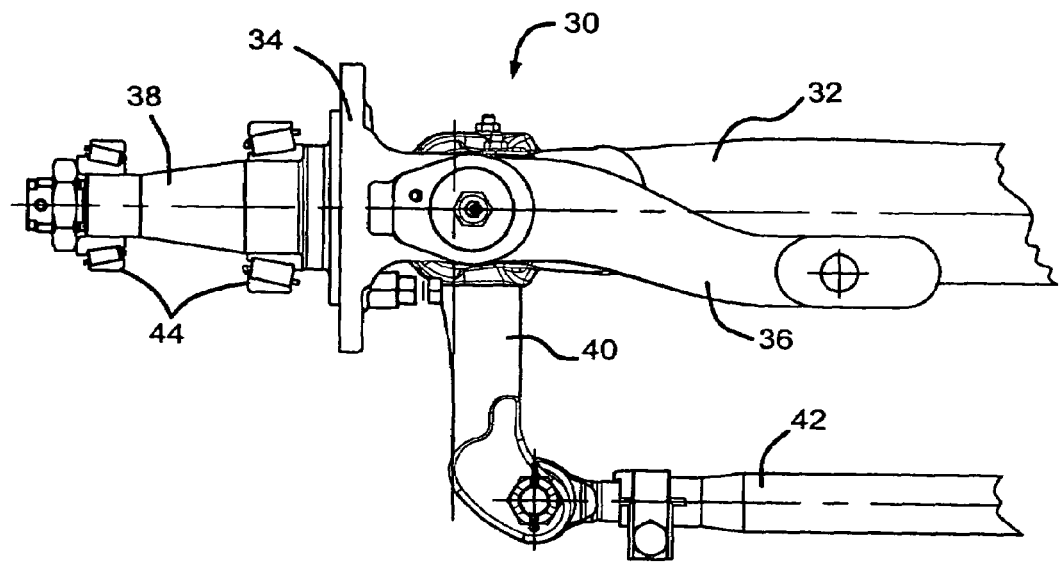
FIG. 1A is a schematic, partial top view of components of the present invention.
Figure 1B:
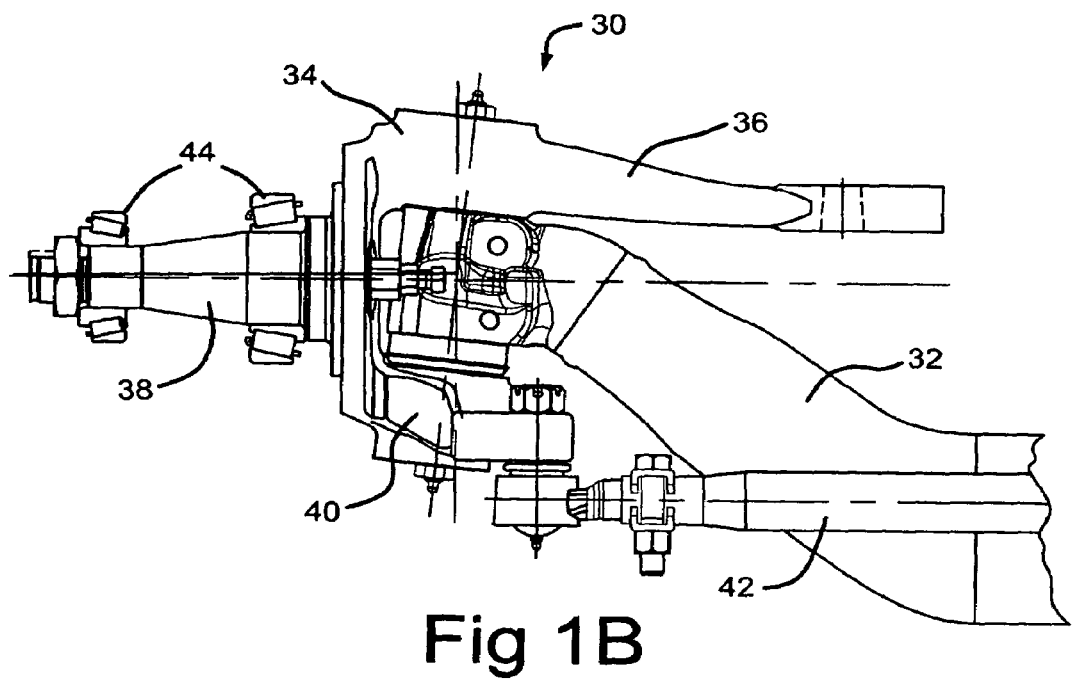
FIG. 1B is a schematic, partial rear view of the structure shown in FIG. 1A.

Referring now to FIGS. 1A and 1B, only an end portion 30 of one half of a steer axle 32 of the present invention is shown attached to a knuckle 34. Although only an end portion 30 of one half of the steer axle 32 is shown, it should be appreciated that the other end portion on the other half of the steer axle 32 that is not depicted is substantially identical to the end portion 30 that is shown.

The knuckle 34 is attached to the steer axle 32 by a king pin (not shown) that permits the knuckle 34 to pivot about the end of the steer axle 32. The knuckle 34 depicted in the figures comprises a steer arm 36, a spindle 38 and a tie rod arm 40. The steer arm 36 is connected to the steering mechanism of the vehicle, as known by those skilled in the art, and the tie rod arm 40 is connected to a tie rod 42.

Bearings 44 are mounted about the spindle 38 to rotatably support a wheel hub (not shown), as known by those skilled in the art. Although one embodiment of a knuckle 34 has been depicted in the figures and described above, it should be appreciated the present invention is not limited to knuckles of this particular configuration. Instead, knuckles of virtually any configuration may be used with the present invention.

Turning now to FIGS. 2A and 2B, a preferred embodiment of the steer axle 32 of the present invention is depicted. The steer axle 32 has a central portion 46 bounded by two end portions 48. The end portions 48 are angled upwardly from the central portion 46. The central portion 46 and some of the end portions 48 are defined by a top surface 50, a forward surface 52 and a rear surface 54. The forward surface 52 and the rear surface 54 are so named as they substantially face the forward and the rear of the vehicle, respectively.

As best seen in FIG. 3, the surfaces 50, 52, 54 are joined together by radiused edge portions 56. The three-sided configuration provides the steer axle 32 with a generally inverted triangle design. It can also be seen from FIG. 3 that the surfaces 50, 52, 54 define a substantially hollow interior portion 58 of the steer axle 32.

FIG. 4 provides another cross-sectional view near the transition of the central portion 46 to the end portion 48. Based on FIG. 4 it can be appreciated that some of the end portion 48 of the steer axle 32 is defined by the three surfaces 50, 52, 54. FIG. 5 provides a cross-sectional view near a beam head receiving portion 60 of the steer axle 32 in the end portion 48. As seen in FIG. 5, the steer axle 32 has a curvilinear cross-section. More preferably, the cross-section at FIG. 5 is substantially round. Thus, the figures of the preferred embodiment of the present invention depict the steer axle 32 transitioning from an inverted triangle cross-section to a round cross-section in the end portion 48.

Figure 6A:
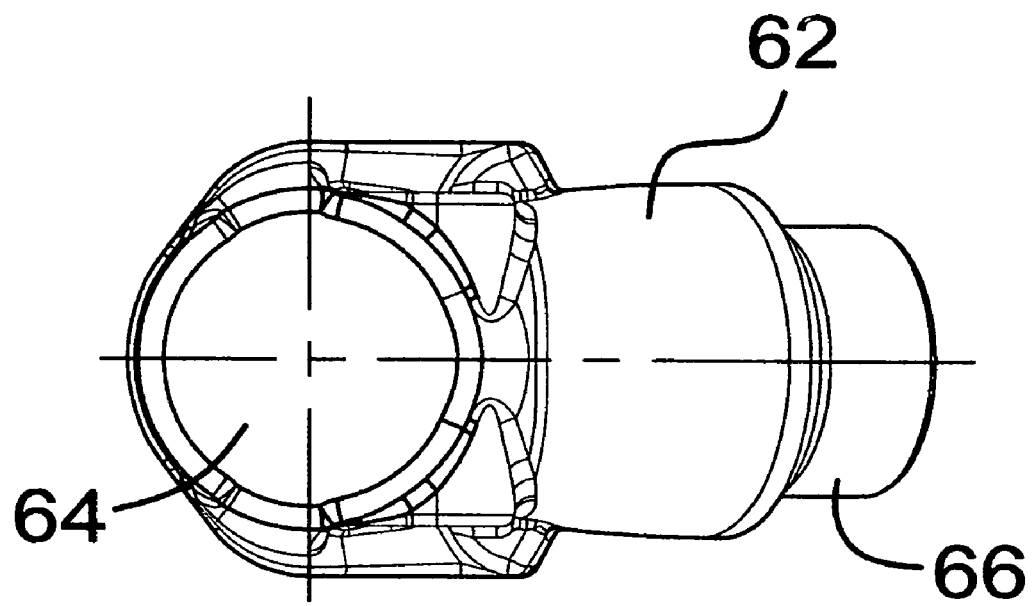
FIG. 6A is a schematic, top view of a beam head of the present invention.
Figure 6B:
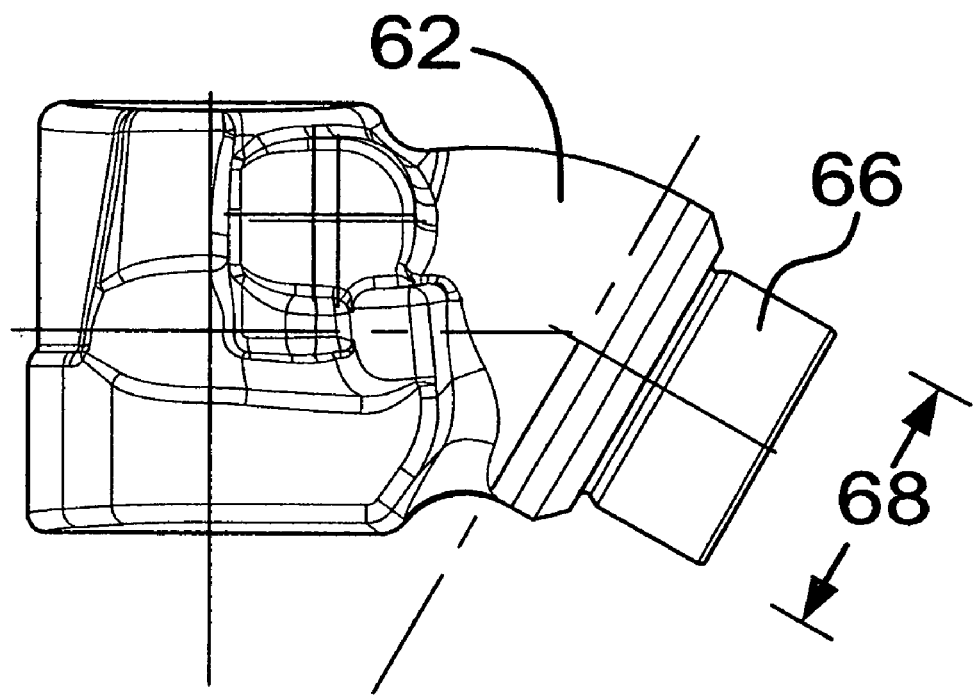
FIG. 6B is a schematic, back view of the beam head of FIG. 6A.

FIGS. 2A and 2B depict a beam head 62 located in the beam head receiving portion 60 of the steer axle 32. As seen in these figures, as well as in FIGS. 6A and 6B, the beam head 62 has a hollow interior portion 64 for receiving the king pin mentioned above. The beam head 62 also has a neck portion 66 having a complimentary exterior diameter 68 to an inner portion (not shown) of the beam head receiving portion 60.

Figure 7:
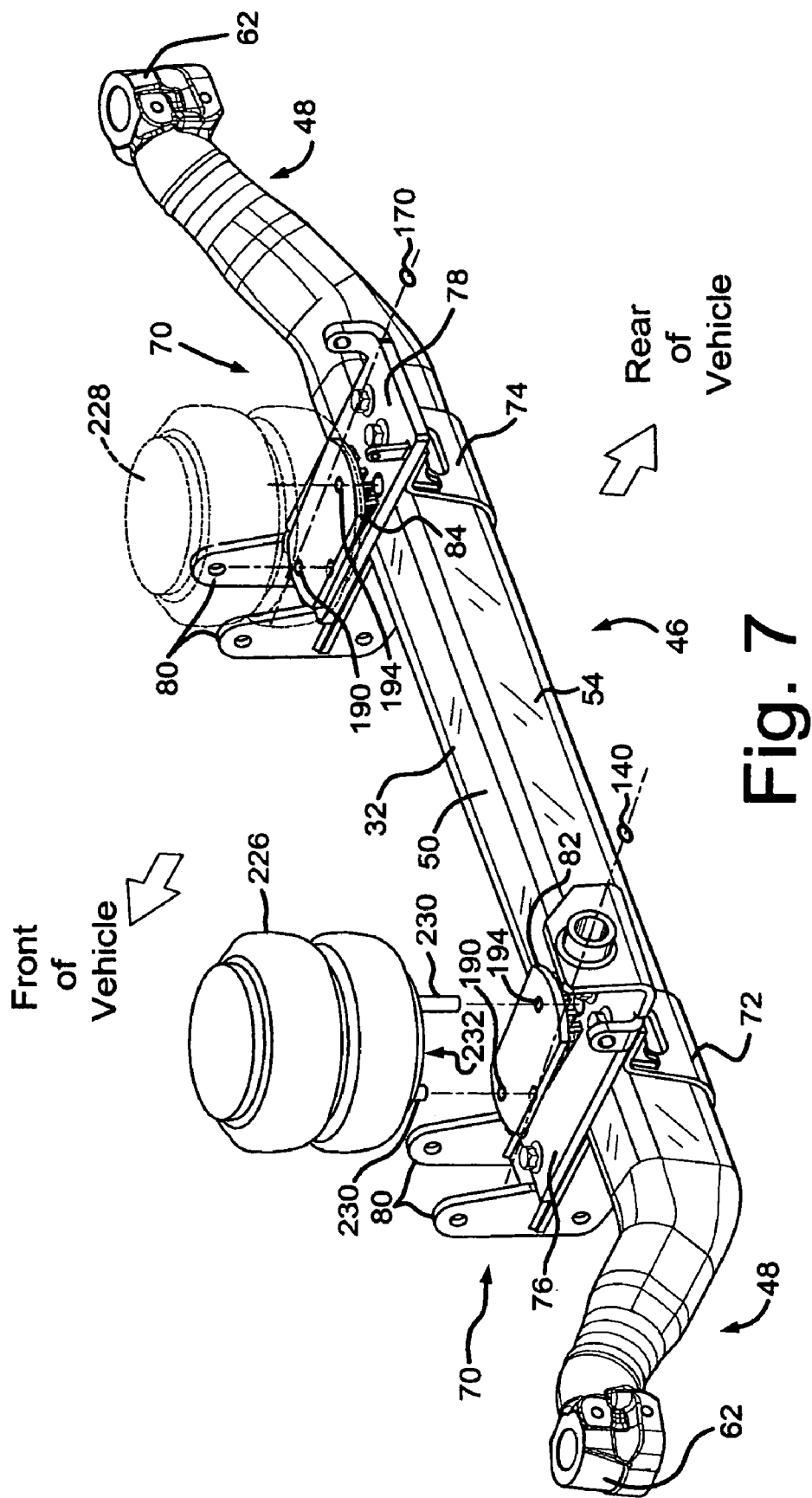
FIG. 7 is a schematic, rear perspective view of the present invention.

The steer axle 32, with a beam head 62 located in each of the end portions 48, is shown in FIG. 7 along with two suspension assemblies 70 located about the central portion 46 of the steer axle 32. Each suspension assembly 70 is preferably comprised of a first and a second spring seat 72, 74, a first and a second plate 76, 78, a plurality of bracket links 80, and a first and a second spring pad 82, 84.

Figure 8:
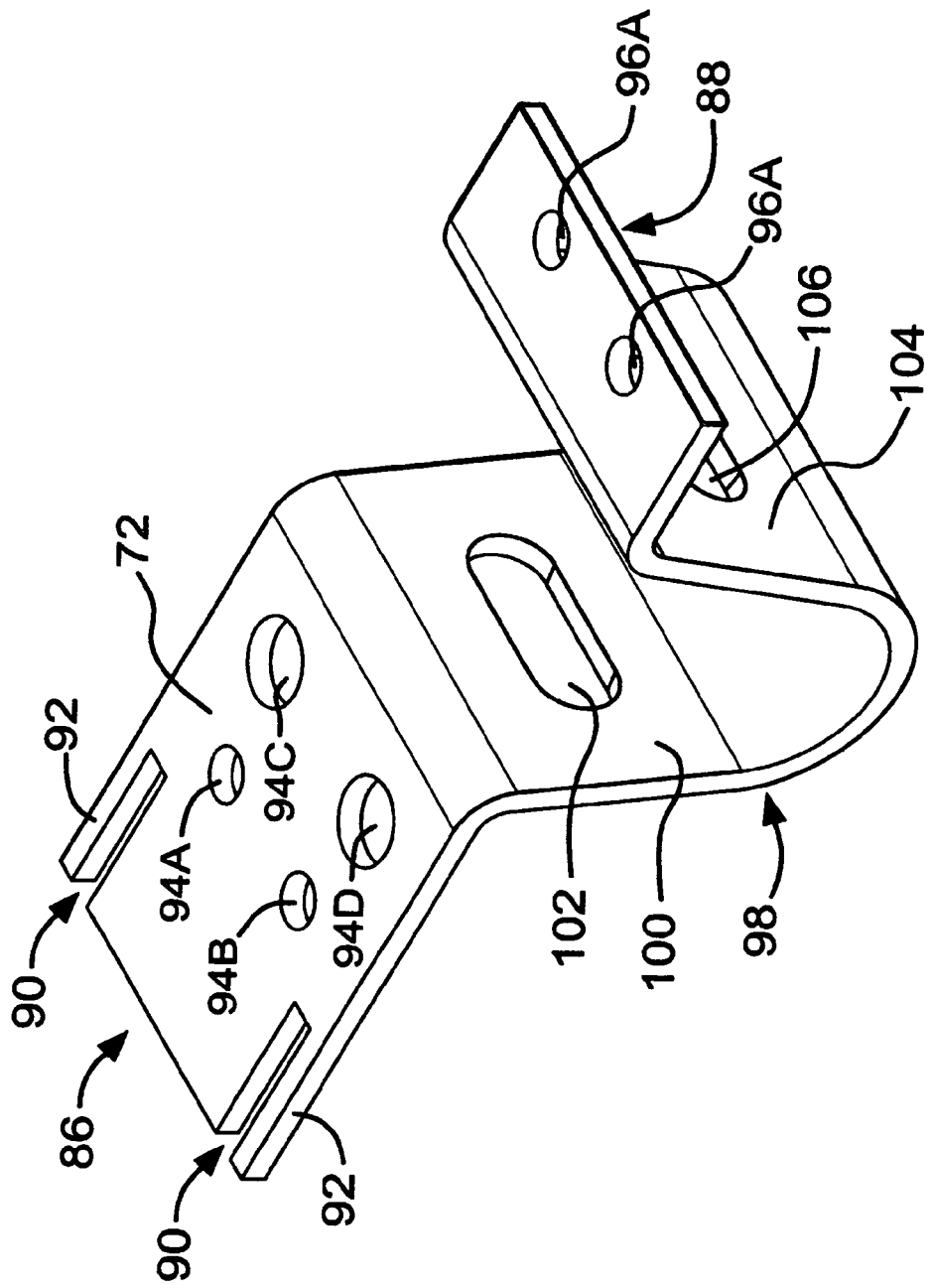
FIG. 8 is a schematic, rear perspective view of a spring seat of the present invention.

One of the two spring seats is depicted in FIG. 8. The first and second spring seats 72, 74 are substantially identical to one another so for clarity and conciseness only the first spring seat 72 is depicted in FIG. 8.

The first spring seat 72 comprises a forwardly extending flange 86 and a rearwardly extending flange 88. The forwardly extending flange 86 defines two slots 90. The slots 90 are preferably substantially parallel to one another and each slot 90 is adjacent one of the side edges 92 of the first spring seat 72.

The forwardly extending flange 86 also defines at least apertures 94A-94D for receiving mechanical fasteners, described in more detail below. Similarly, the rearwardly extending flange 88 defines at least two apertures 96A-96B for receiving mechanical fasteners, also described in more detail below.

The forwardly extending flange 86 and the rearwardly extending flange 88 are connected by a valley portion 98. The valley portion 98 has a complimentary shape to the forward surface 52 and the rear surface 54 of the steer axle 32. A forward wall 100 of the valley portion 98 defines an aperture 102 therethrough and a rear wall 104 of the valley portion 98 defines an aperture 106 therethough.

Figure 9:
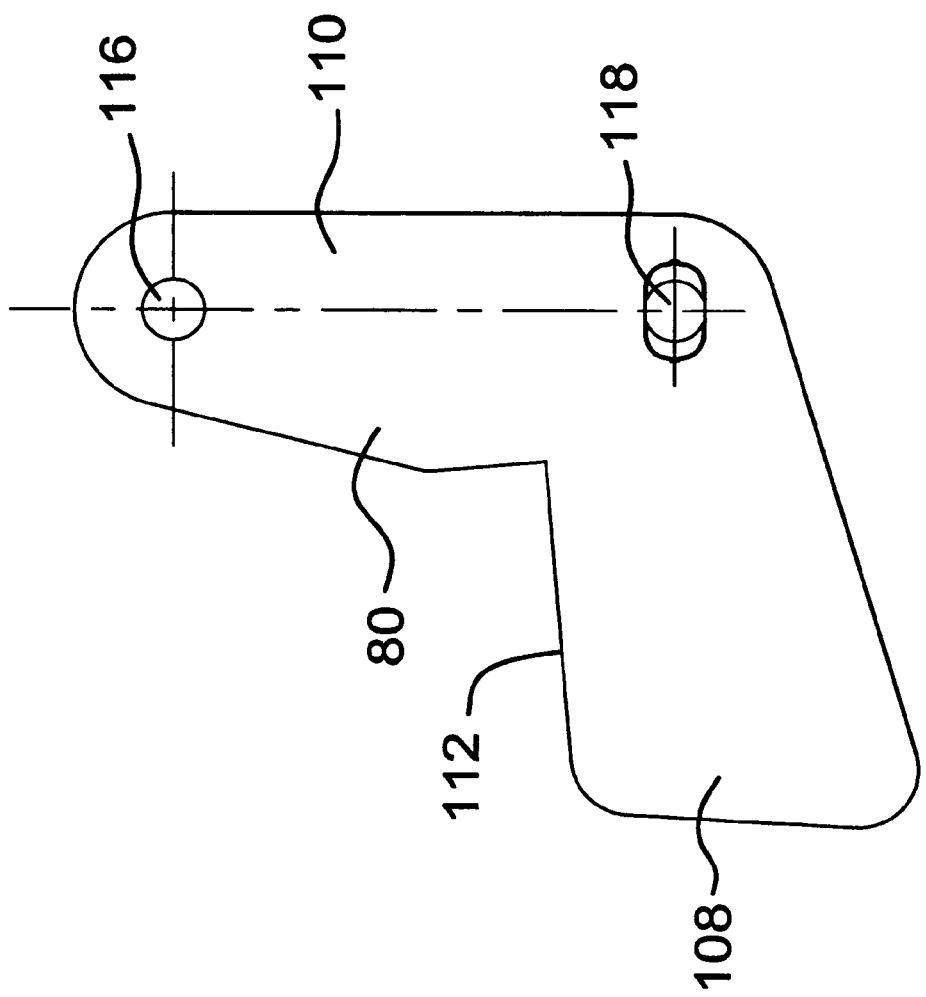
FIG. 9 is a side view of a schematic embodiment of a suspension bracket of the present invention.

Looking now at FIG. 9, a single bracket link 80 of the suspension assembly 70 is depicted. Since each of the bracket links 80 of the suspension assembly 70 are substantially identical to one another, a single bracket link 70 is depicted in FIG. 9 and described herein. The bracket link 70 has a horizontal portion 108 and a vertical portion 110. An upper edge 112 of the horizontal portion 108 is complimentary to a bottom surface 114 of the forwardly extending flange 86 of the spring seats 72, 74. The bracket link 80 has an upper aperture 116 and a lower aperture 118 for attaching the bracket link 80 to other suspension components (not shown) of the vehicle.

Figure 10:
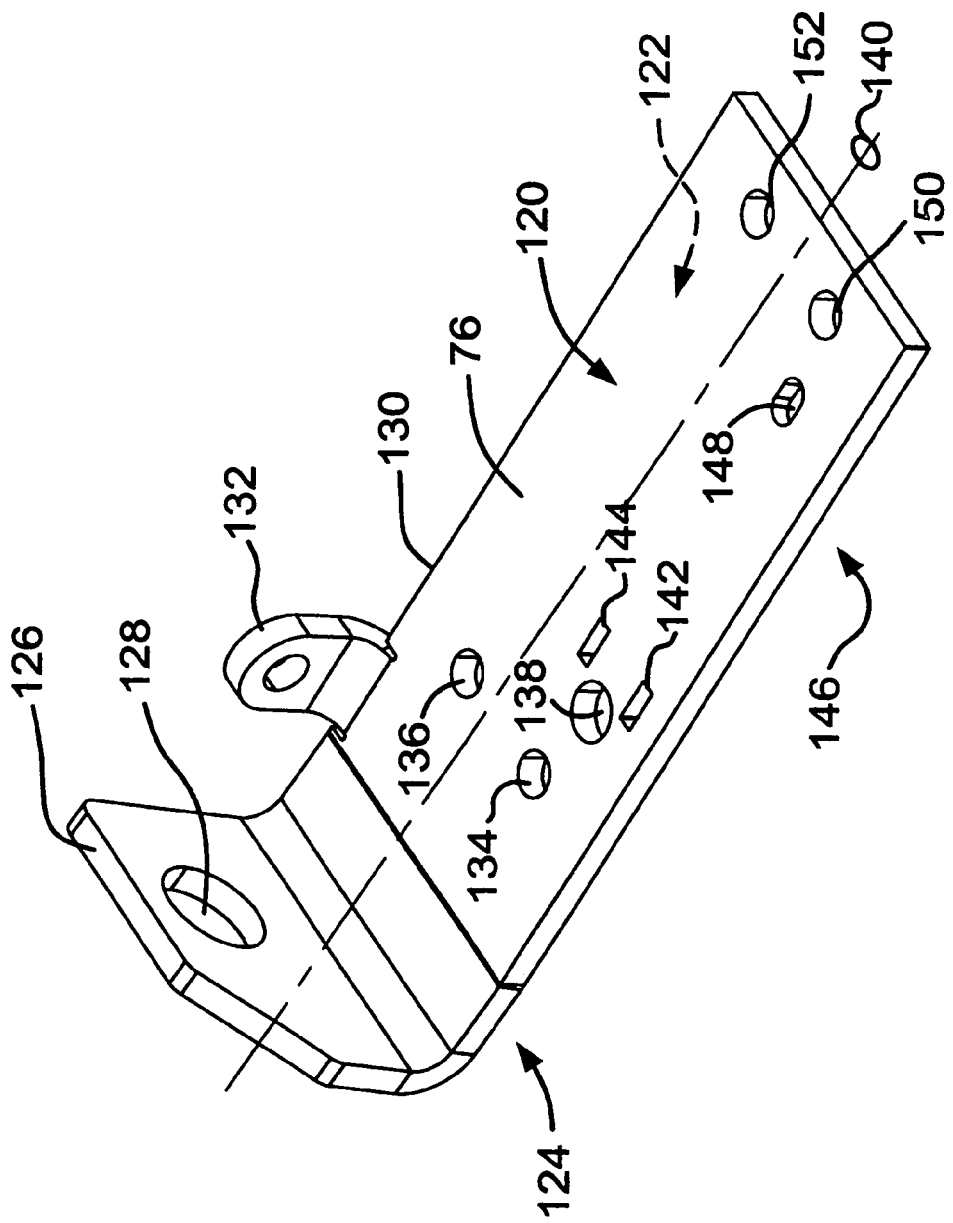
FIG. 10 is a schematic, upper front view of a plate of the present invention.

FIG. 10 depicts a preferred embodiment of the first plate 76 of the suspension assembly 70 of the present invention. The first plate 76 has substantially planar upper and lower surfaces 120, 122. A rear portion 124 of the first plate 76 is defined by an upstanding flange 126. The flange 126 preferably has an aperture 128 located therethrough. Adjacent the rear portion 124 and upstanding from a side edge 130 of the first plate 76, a shock mount 132 is provided.

A plurality of apertures are located in the first plate 76. The apertures comprise both round and oval or rectangular apertures. Preferably, a first aperture 134 and a second aperture 136 are located proximate the rear portion 124 of the first plate 76. Moving forward from the first and second apertures 134, 136 there is located a single third aperture 138 offset from a centerline 140 of the plate 76. Slightly forward of the single third aperture 138, two oval or rectangular apertures are located in the plate 76. These apertures will be referred to fourth and fifth apertures 142, 144. Adjacent a forward portion 146 of the plate 76, there is located a sixth aperture 148 preferably in the shape of an oval or a rectangle. The sixth aperture 148 is offset from the centerline 140. A seventh and an eighth aperture 150, 152 are located in the forward portion 146 of the plate 76, forward of the sixth aperture 148.

Figure 11:
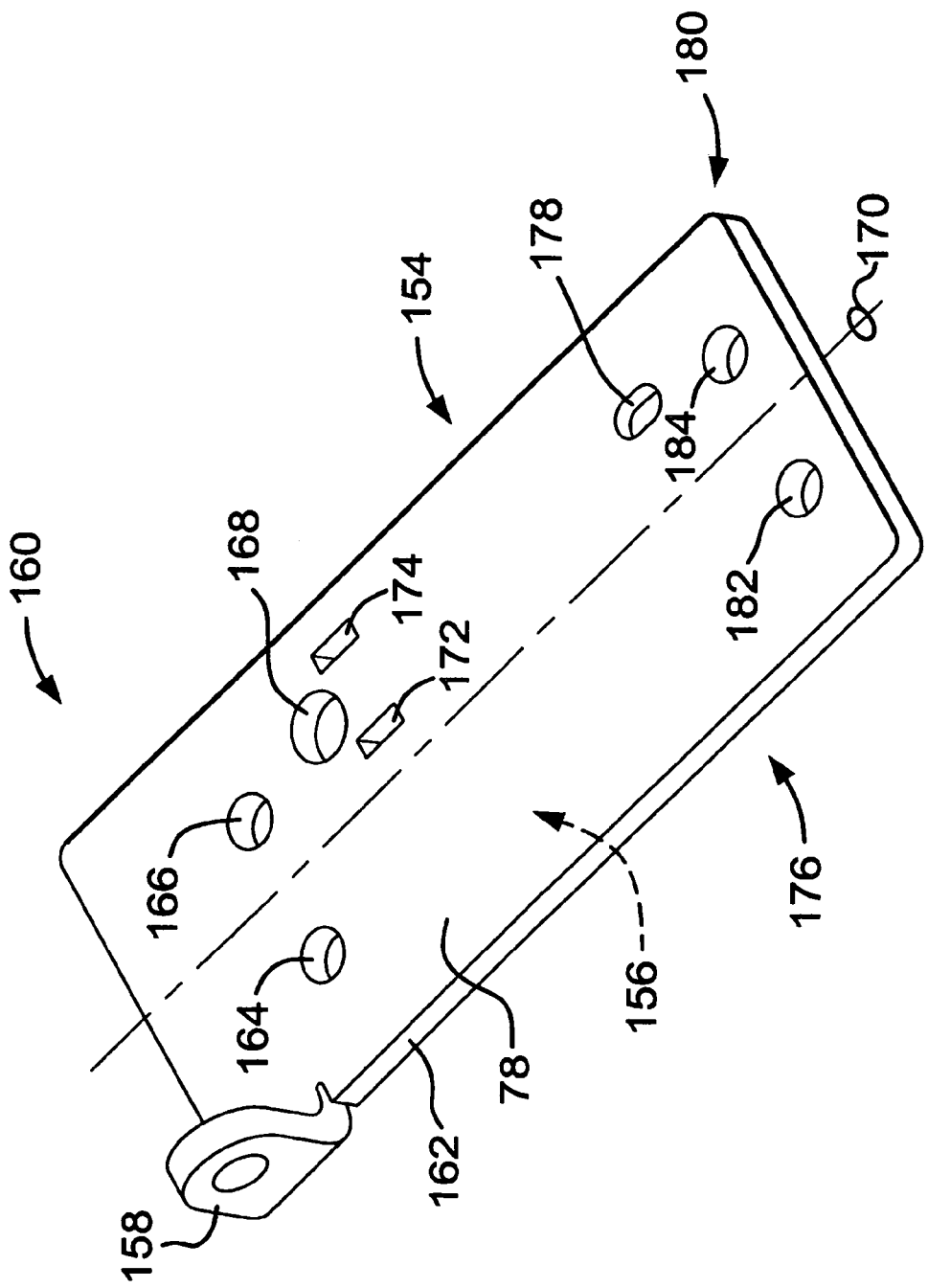
FIG. 11 is a schematic, upper front view of another plate of the present invention.

Turning now to FIG. 11, the second plate 78 of the suspension assembly 70 is shown. The second plate 78 has substantially planar upper and lower surfaces 154, 156. A shock mount 158 is located adjacent a rear portion 160 and along a side edge 162 of the second plate 78.

The second plate 78 defines a plurality of apertures. A first and a second aperture 164, 166 are located adjacent one another in the rear portion 160 of the plate 78. Forward from the first and second apertures 164, 166 there is located a third aperture 168. The third aperture 168 is offset from a centerline 170 of the plate 78. Slightly forward from the third aperture 168, a fourth and a fifth aperture 172, 174 are located in the plate 78. Preferably, the fourth and fifth apertures 172, 174 are oval or rectangular in shape. The fourth and fifth apertures 172, 174 are also offset from the centerline 170 of the plate 78. In a forward portion 176 of the plate 78, a sixth aperture 178, being oval or rectangular in shape, is provided. Next, adjacent a forward edge 180 of the plate 78, there is provided a seventh and an eighth aperture 182, 184.

Figure 12A:
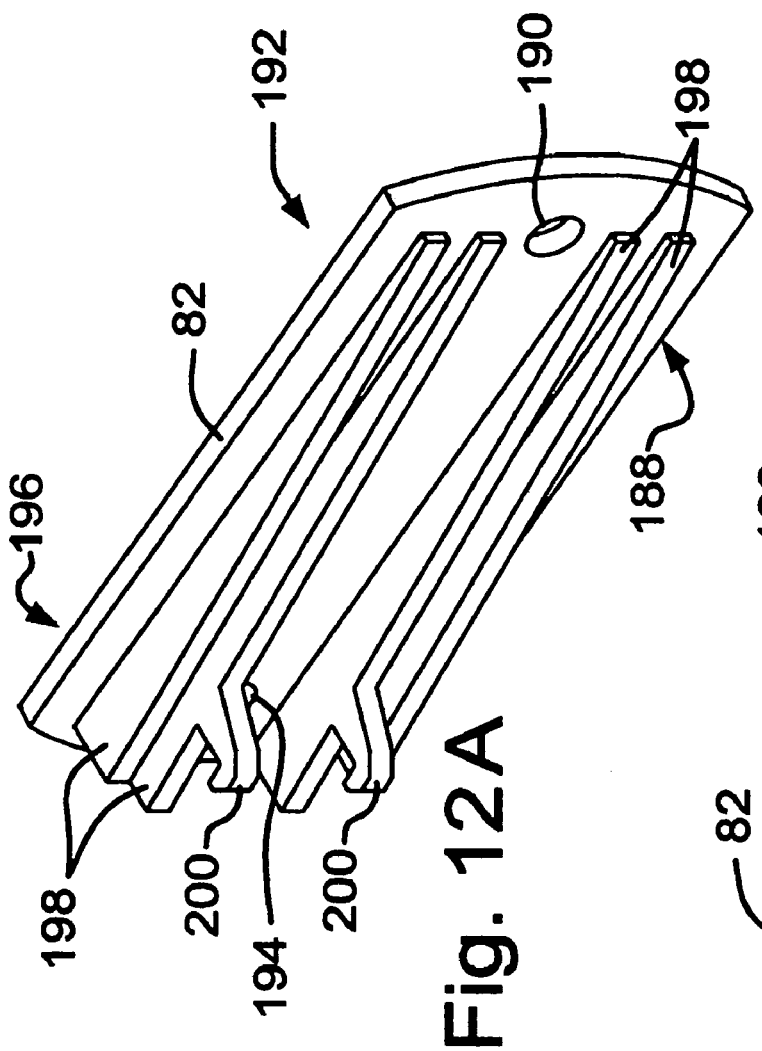
FIG. 12A is a schematic, bottom perspective view of a spring pad of the present invention.
Figure 12B:
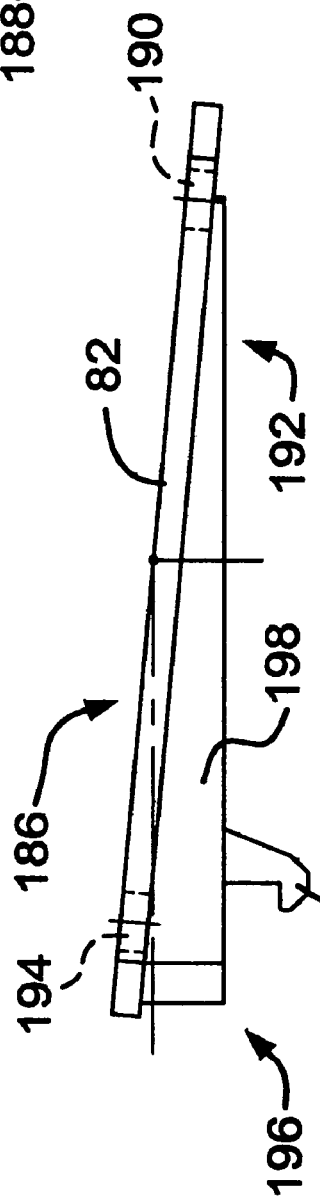
FIG. 12B is a schematic side view of the spring pad of FIG. 12A.

The suspension assembly 70 also comprises the first and the second spring pad 82, 84, as shown in FIG. 7. The first and the second spring pads 82, 84 are substantially identical to one another so for purposes of clarity and conciseness, just the first spring pad 82 is shown in FIGS. 12A and 12B. The first spring pad 82 has a substantially flat upper surface 186 and a substantially flat lower surface 188. A first aperture 190 is substantially centered and located through the upper surface 186 to the lower surface 188 in a forward portion 192 of the spring pad 82. A second aperture 194 is centered and similarly located in a rear portion 196 of the spring pad 82.

Attached to, or integrally formed with, the lower surface 188 of the spring pad 82 there is provided at least one ramp 198. As shown in FIG. 12A, the lower surface 188 has four ramps 198 located thereon. It should be appreciated that the number of ramps is not material to the present invention and any number of ramps can be used without departing from the scope of the present invention. Preferably, the ramps 198 taper toward the forward portion 192 of the spring pad 82 from the rear portion 198 of the spring pad 82.

Two hooks 200 are located on two of the ramps 198 of the spring pad 82, as can be seen in both FIGS. 12A and 12B. The hooks 200 extend downwardly from the ramps 198. Preferably, the hooks 200 face the rear portion 196 of the spring pad 82. Although two hooks 200 on two adjacent ramps 198 are depicted, it should be appreciated that any number of hooks 200 may be located on any number of the ramps 198. The hooks 200 may also be located on the lower surface 188 of the spring pad 82.

Figure 13:
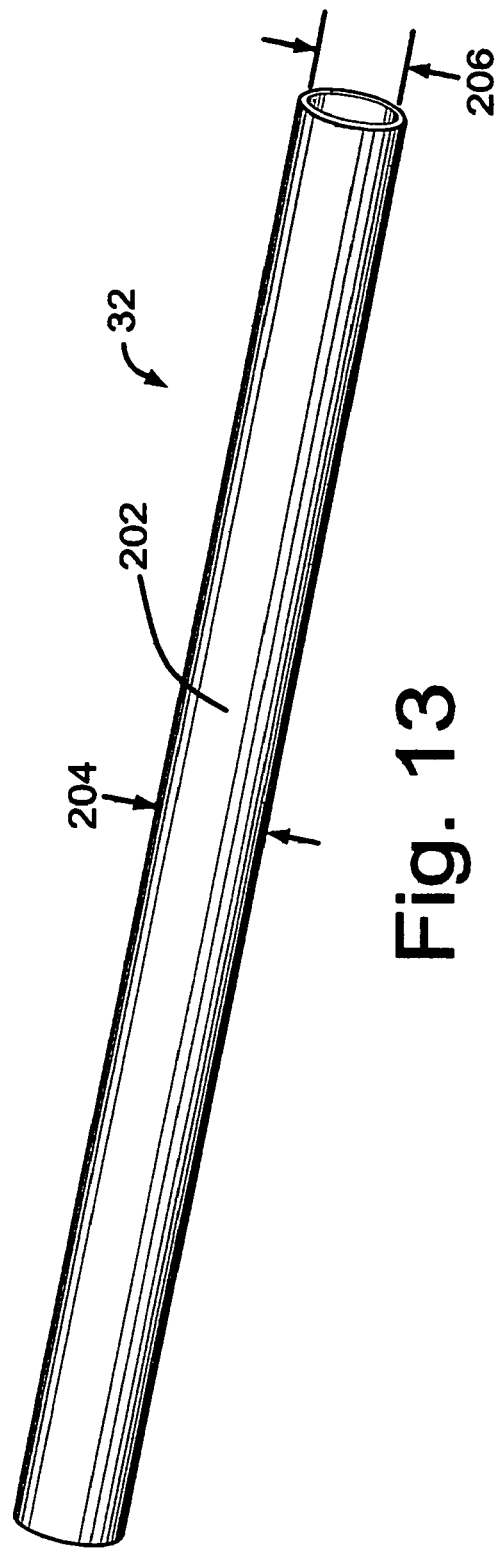

A method of making the steer axle 32, and its associated suspension assemblies 70, comprises providing a length of tubing 202 constructed of a resilient material, such as that seen in FIG. 13. The material may be, by way of example only, steel or iron. Preferably, the tube 202 has a substantially constant outer diameter 204 and a substantially constant inner diameter 206. The tube 202 is substantially hollow. For clarity, the tube 202 will now be referred to as the steer axle 32.

Figure 14:
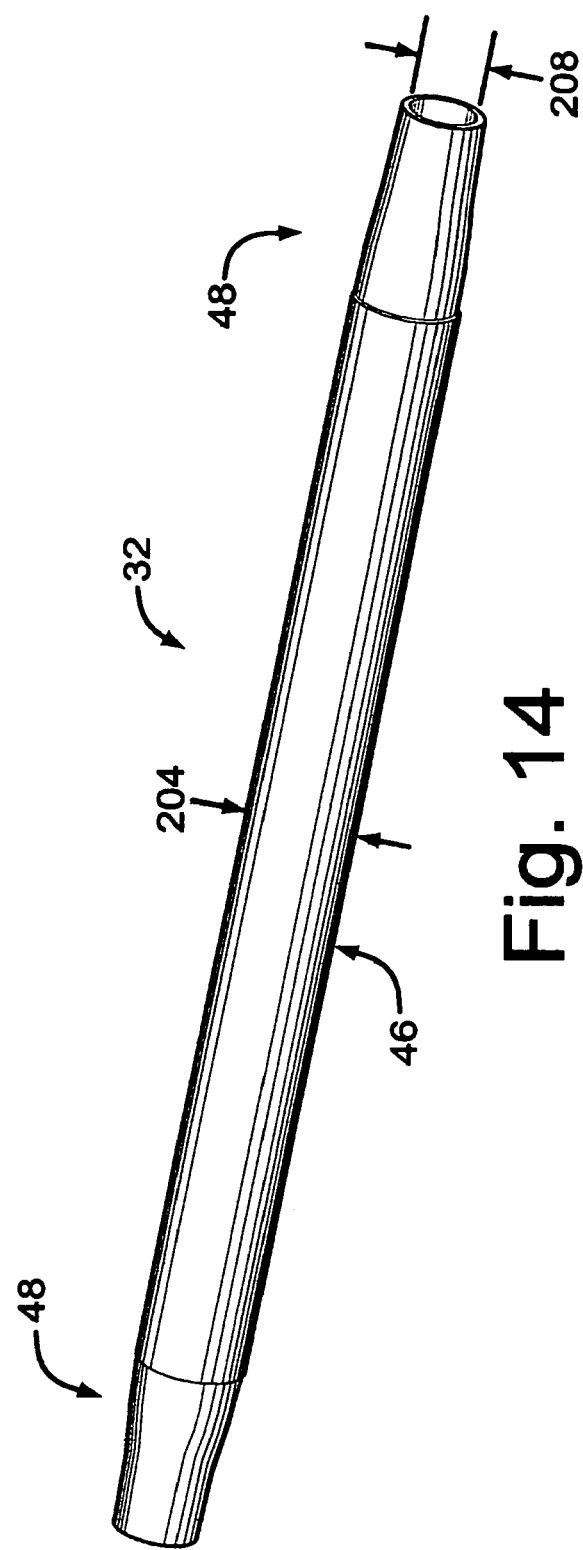

The end portions 48 of the steer axle 32 are then swaged, as shown in FIG. 14, using any method known by those skilled in the art. Swaging the end portions 48 results in the end portions 48 having a smaller outer diameter 208 than the outer diameter 204 of the central portion 46.

Turning now to FIG. 15, the swaged tube steer axle 32 is located in a die to create the top surface 50, the forward surface 52 and the rear surface 54 of the central portion 46 and some of the two end portions 48. Preferably, the ends 210 of the steer axle 32 have a substantially round cross-section which are also formed by the die.

As shown in FIG. 16, the steer axle 32 is then located in a device, like a press, to bend the end portions 48 in an upward direction. The upward angle at which the end portions 48 might be located varies with each application of the gear axle 32. Thus, the angle of the end portions 48 depicted in the figures should only be considered one embodiment and in no way limiting to the present invention.

Figure 17:
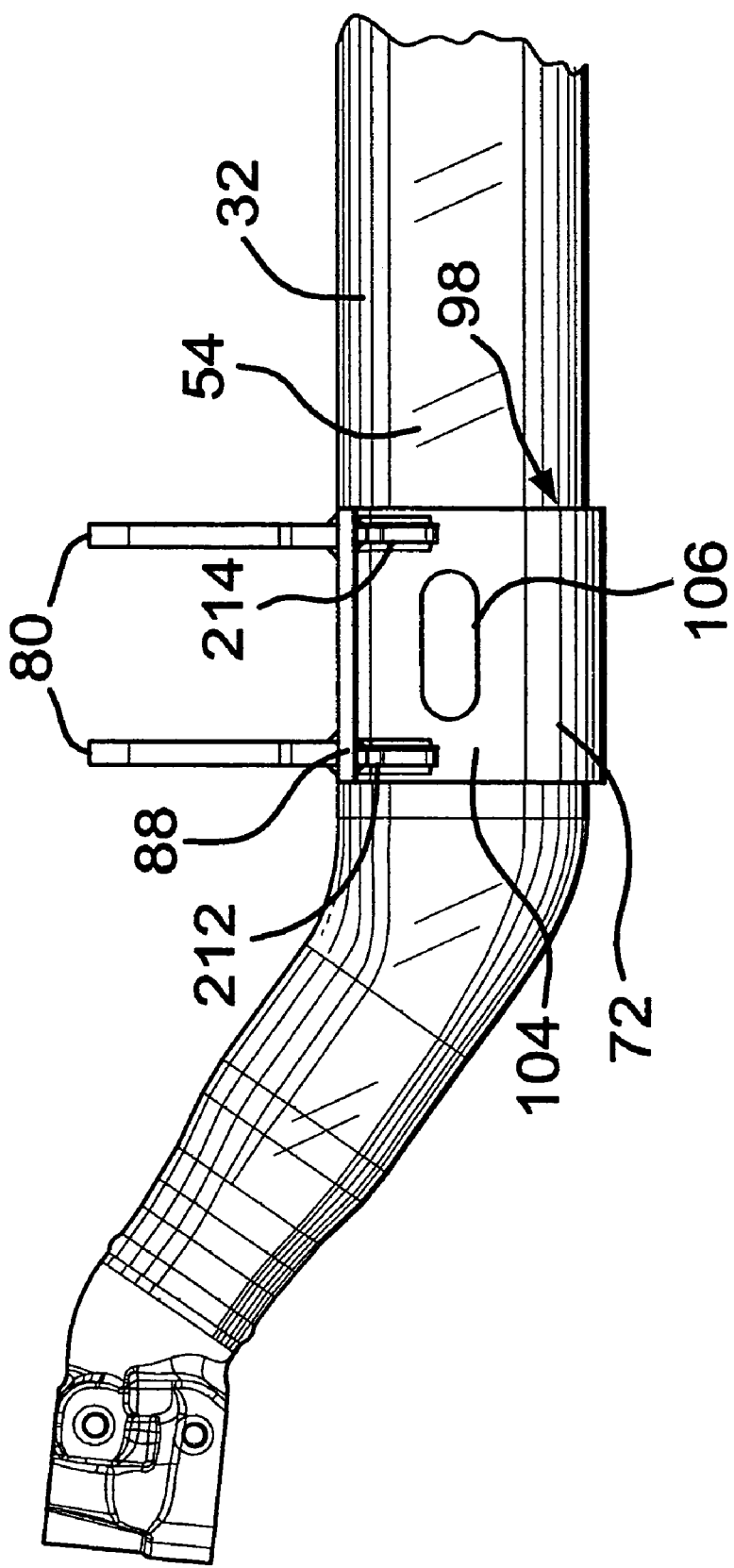
FIG. 17 is a partial, schematic rear view of components of the present invention.

Looking now at FIG. 17, the step of securing the first spring seat 72 to the steer axle 32 is shown. In the preferred embodiment, the spring seat 72 is welded to the steer axle 32 by locating a weldment that connects the area around the aperture 106 in the rear wall 104 of the valley portion 98 with the rear surface 54 of the steer axle 32. A second weldment (not shown) is provided to connect the area around the aperture 102 in the forward wall 100 of the valley portion 98 with the forward surface 52 of the steer axle 32. Although only the first spring seat 72 is depicted as being attached to the steer axle 32 in FIG. 17, it should be appreciated that the same step of attaching the second spring seat 74 to the steer axle 32 is taken on the other end of the steer axle 32. Preferably, the forwardly extending flanges 86 of the first and second spring seats 72, 74 extend forwardly from the forward surface 52 of the steer axle 32. The rearwardly extending flanges 88 of the first and second spring seats 72, 74 extend rearwardly from the rear surface 54 of the steer axle 32.

FIG. 17 also depicts a first and a second bracket support 212, 214 attached to the first spring seat 72. The first and second bracket supports 212, 214 may be integrally formed with the first spring seat 72 or they may welded thereto. Preferably, the bracket supports 212, 214 are located between the rearwardly extend flange 88 and the rear wall 104 of the valley portion 98 of the spring seat 72 to support the rearwardly extending flange 88. The second spring seat 74 is fitted similarly with bracket supports 212, 214.

Figure 18:
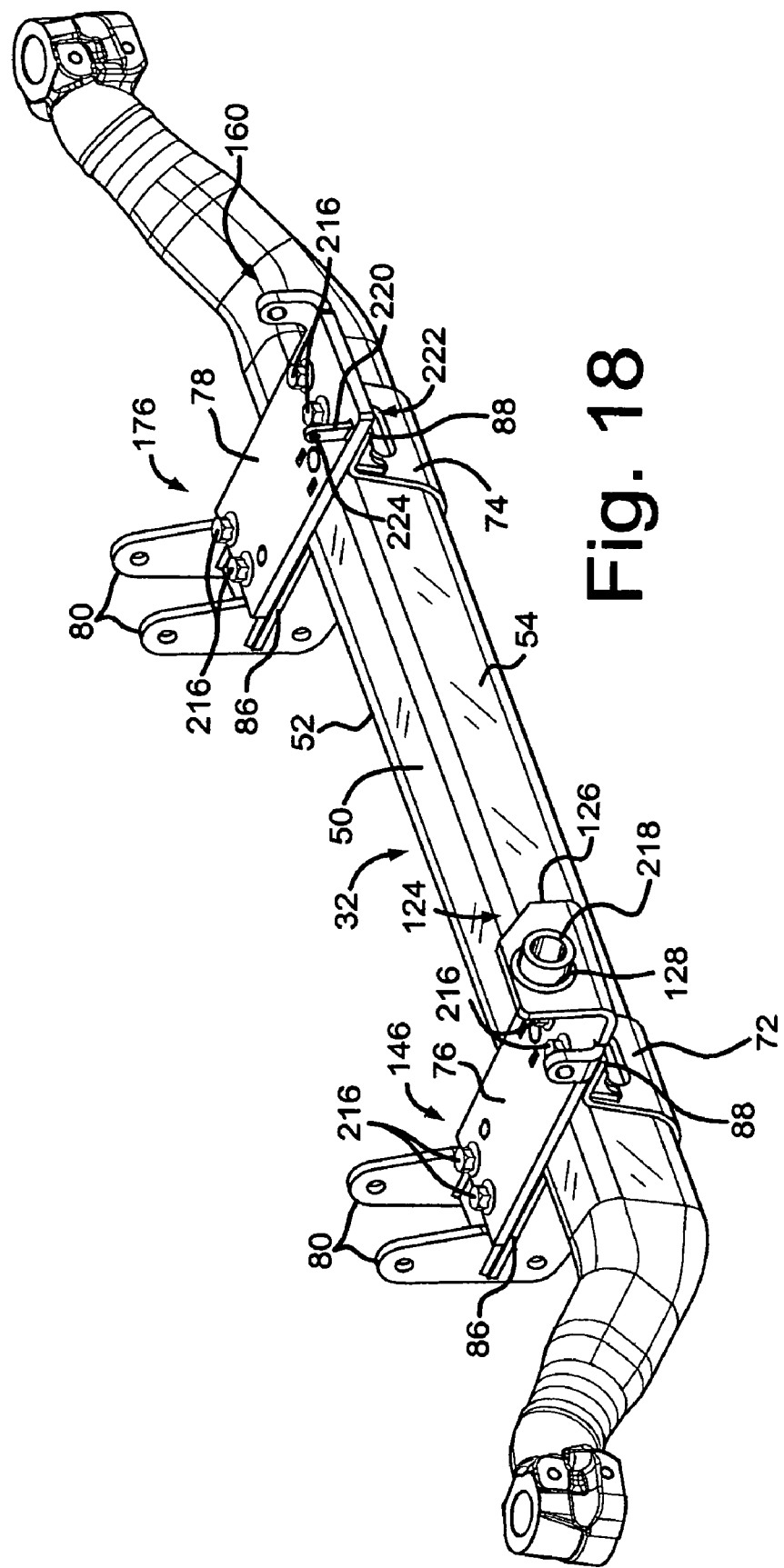
FIG. 18 is a schematic, rear perspective view of the present invention.

The bracket links 80 are then located in the slots 90 of the spring seats 72, 74 as shown in FIG. 18. A weldment is located at the intersection of the spring seats 72, 74 with the bracket links 80 to secure the bracket links 80 in place. The bracket links 80 support the forwardly extending flanges 86 of the spring seats 72, 74.

FIG. 18 also depicts the first and second plates 76, 78 being attached to the first and second spring seats 72, 74, respectively. Preferably, the first and second plates 76, 78 are secured to the first and second spring seats 72, 74 with a plurality of mechanical fasteners 216, such as nuts and bolts. The fasteners 216 are located through the apertures in the forward portions 146, 176 of the first and second plates 76, 78 and then through the apertures in the forwardly extending flanges 86 of the first and second spring seats 72, 74. Similarly, the fasteners 216 are located through the apertures in the rear portions 124, 160 of the first and second plates 76, 78 and then through the apertures in the rearwardly extending flanges 88 of the first and second spring seats 72, 74.

As shown in FIG. 18, it is preferred that the rear portions 124, 160 of the first and second plates 76, 78 extend rearwardly from the rear surface 54 of the steer axle 32 and that the forward portions 146, 176 of the first and second plates 76, 78 extend forward from the forward surface 52 of the steer axle 32.

FIG. 18 also shows a taper plug 218 located in the aperture 128 of the upstanding flange 126 of the first plate 76. The taper plug 218 is preferably welded into the aperture 128. The taper plug 218 provides a mating surface for a suspension component (not shown) of the vehicle.

FIG. 18 also shows a support member 220 attached along a side portion 222 of the rear portion 160 of the plate 78. The support member 220 is attached to the plate 78 by welding. A component (not shown) of the suspension is located through the aperture 224 in the support member 220.

Figure 19:
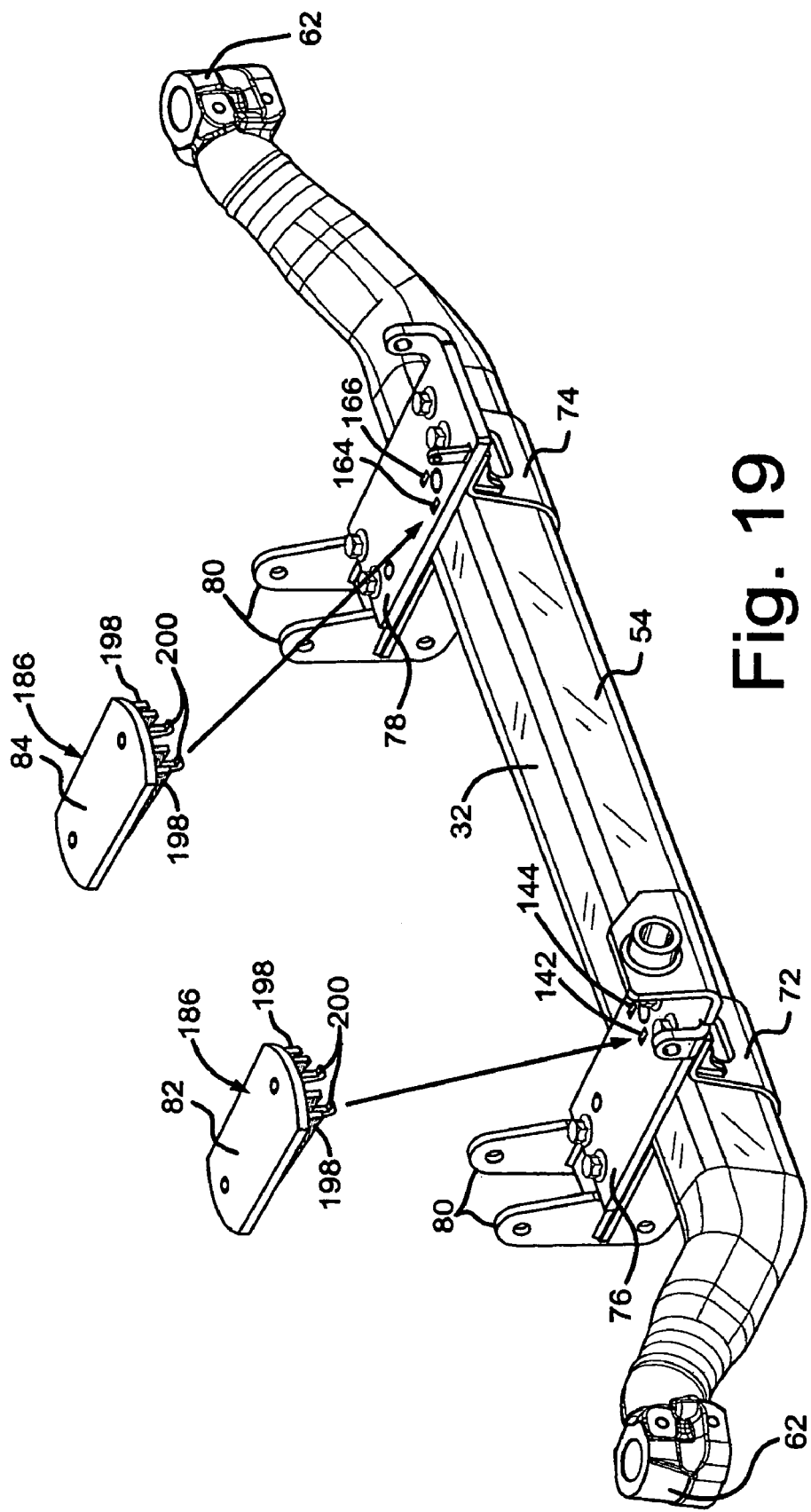
FIG. 19 is a schematic, rear perspective view of the present invention.

Referring back now to FIG. 7 and to FIG. 19, the first and second spring pads 82, 84 are shown located on the first and second plates 76, 78, respectively. Preferably, the hooks 200 of the first spring pad 82 are located into apertures 142, 144 of the first plate 76 and the hooks 200 of the second spring pad 84 are located into apertures 164, 166 of the second plate 78. The apertures 142, 144, 164, 166 permit the hooks 200 to be located in the apertures 142, 144, 164, 166 and then they are slid rearwardly into locking engagement with the plates 76, 78.

The hooks 200 reduce, or prevent, the spring pads 82, 84 from moving vertically and laterally with respect to the plates 76, 78. Based on FIG. 7 and the description above of the location of the apertures 142, 144, 164, 166, it can be appreciated that the spring pads 82, 84 are offset from the centerlines 140, 170 of the plates 76, 78.

The spring pads 82, 84 also set the caster angle for the steer axle 32 as the ramps 198 rest on the substantially flat upper surfaces 120, 154 of the plates 76, 78. The caster angle may be between approximately 1 degree to approximately 10 degrees.

A first air spring 226 is shown above the first spring pad 82 and a second air spring 228 is shown in hidden lines for purposes of clarity on the second spring pad 84. As best seen on the first air spring 226, two fastening devices 230 extend downwardly from a bottom portion 232 of the air spring 226. The fastening devices 230 are designed to fit through apertures 190, 194 in the spring pad 82. The fastening devices 130 extend through apertures 190, 194 and into and through apertures 138 and 148 of the first plate 76 and into and through apertures 168, 178 in the second plate 78. Nuts can be secured to the fastening devices 130 on the undersides of the plates 76, 78 to secure the air springs 226 to the pads 82, 84.

Since the air springs 226, 228 rest on the angled upper surfaces 186 of the spring pads 82, 84, the fastening devices 230 extending from the bottom portion 232 of the air springs 226, 228 are the same number of degrees from vertical as the angle on the spring pads 82, 84. It can therefore now be more fully appreciated why it is preferably to use rectangular or oval apertures in the plates 76, 78 as the fastening devices 230 extend through the plates 76, 78 at an angle. Nuts and washers can be located on the ends of the fastening devices 230 located through the apertures of the plates 76, 78 to secure the air springs 226, 228 in place on the spring pads 82, 84. Upper portions 234 of the air springs 226, 228 may be connected to frame members of the vehicle, as known to those skilled in the art.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A steer axle for a vehicle, comprising:
   a substantially hollow axle having a central portion bounded by two end portions, said central portion defined by three surfaces and said end portions having curvilinear cross-sections;
   a first and a second spring seat secured to said central portion of said axle, wherein said first and said second spring seats each have a portion that substantially wraps around a first and a second of said three surfaces of said central portion;
   a first plate and a second plate secured to said first and second spring seats, respectively, wherein said first plate and said second plate extend over a third surface of said central portion; and
   a first angled spring pad and a second angled spring pad each secured to an upper surface of said first plate and said second plate, respectively.

2. The steer axle of claim 1, wherein said three surfaces of said central portion are a forward surface, a rear surface and a top surface, said three surfaces being arranged to create a generally triangular cross-section.

3. The steer axle of claim 1, wherein said end portions of said axle are upwardly turned and each end portion has a beam head located therein.

4. The steer axle of claim 2, wherein each of said spring seats wraps around said forward surface and said rear surface of said central portion and each of said spring seats has a rearwardly extending flange and a forwardly extending flange.

5. The steer axle of claim 4, wherein two bracket links are secured to said forwardly extending flange of said first spring seat and two bracket links are secured to said forwardly extending flange of said second spring seat.

6. The steer axle of claim 5, wherein said first plate is located over said top surface of said central portion and said first plate is connected to said forwardly extending flange and said rearwardly extending flange of said first spring seat and said second plate is located over said top surface of said central portion and said second plate is connected to said forwardly extending flange and said rearwardly extending flange of said second spring seat, wherein both of said plates have two parallel slots.

7. The steer axle of claim 6, wherein both of said angled spring pads taper downwardly in the direction from said rear surface to said forward surface via at least one ramp located on a lower surface of each of said angled spring pads, each of said lower surfaces of said angled spring pads also having at least one hook for engaging said slots on said first and second plates respectively.

8. A steer axle for a vehicle, comprising:
   a substantially hollow axle having a central portion bounded by two end portions, said central portion defined by three surfaces connected by radiused edge portions and said end portions transitioning from said three surfaces to having substantially round cross-sections;
   a first and a second spring seat welded to said central portion of said axle, said first and said second spring seats each comprising:
      a. a portion that substantially wraps around a first and a second of said three surfaces of said central portion; and
      b. a forwardly extending flange and a rearwardly extending flange;
   a first plate and a second plate each respectively secured to said forwardly extending flange and said rearwardly extending flange of said first and second spring seats so that both plates extend over a third surface of said three surfaces of said central portion;
   a first spring pad and a second spring pad each secured to an upper surface of each of said first plate and said second plate respectively wherein said spring pads taper at a downward angle from a rear surface of said axle to a forward surface of said axle; and
   a beam head located in each of said end portions.

9. The steer axle of claim 8, wherein said three surfaces of said central portion are said forward surface, said rear surface and a top surface, said three surfaces arranged to create a generally triangular cross-section.

10. The steer axle of claim 8, wherein said end portions of said axle are upwardly turned.

11. The steer axle of claim 8, wherein each of said spring seats wraps around said forward surface and said rear surface of said central portion.

12. The steer axle of claim 8, wherein two bracket links are secured to said forwardly extending flange of said first spring seat and two bracket links are secured to said forwardly extending flange of said second spring seat.

13. The steer axle of claim 1, wherein both of said plates have two parallel slots for receiving hooks from said angled spring pads.

* * * * *